W. B. MOUNTENEY.
Diaphragm for Water-Meters.

No. 212,488. Patented Feb. 18, 1879.

UNITED STATES PATENT OFFICE.

WILLIAM B. MOUNTENEY, OF CHICAGO, ILLINOIS.

IMPROVEMENT IN DIAPHRAGMS FOR WATER-METERS.

Specification forming part of Letters Patent No. 212,488, dated February 18, 1879; application filed October 25, 1878.

*To all whom it may concern:*

Be it known that I, WILLIAM B. MOUNTENEY, of Chicago, in the State of Illinois, have invented certain Improvements in Flexible Diaphragms for Water-Meters; and I hereby declare the following to be a full, clear, and exact description thereof, reference being had to the accompanying drawings, making part of this specification, in which—

Figure 1:
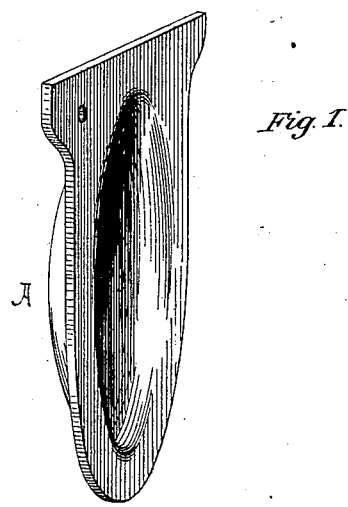
Figure 2:
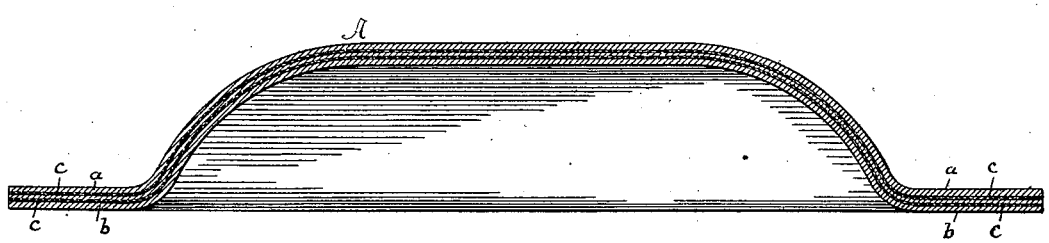

Figure 1 is a view of a diaphragm constructed with my improvements. Fig. 2 is a cross-section of the same.

The object of my invention is to produce a diaphragm for water-meters which shall be water-proof, perfectly pliable, and yet comparatively inelastic, so as to avoid the great difficulty heretofore existing in having the pliable diaphragms stretch so as to give unequal measurement.

My invention consists in making the flexible diaphragm of two or more strata of rubber and an interposed stratum of a textile or other inelastic fabric, the whole made homogeneous, as hereinafter set forth.

In order that those skilled in the art may make and use my invention, I will proceed to describe the manner in which I have carried it out.

In the said drawings, A is a molded flexible diaphragm, formed in the proper shape. This diaphragm consists of two strata of vulcanized rubber, $a\ b$, and an interposed stratum of textile fabric, $c$, or other equivalent non-elastic, or comparatively non-elastic, material, the whole being pressed till homogeneous. The rubber strata $a\ b$ make the diaphragm perfectly flexible and water tight, while the fabric $c$ prevents any positive expansion of the diaphragm and consequent erroneous measurements.

Usually, in making these diaphragms, I take the rubber when soft and formed of the proper thickness for each of the woven fabric. The cloth or textile fabric is interposed between two layers of the rubber, and the whole is then pressed together until the crude rubber is forced into the interstices of the woven fabric, making the whole one solid and compact sheet, and it is then vulcanized to any desirable hardness.

Having thus described my invention, what I claim as new, and desire to secure by Letters Patent, is—

The improved molded diaphragm for water-meters composed of two or more strata of vulcanized rubber, $a\ b$, and the interposed stratum of textile fabric, substantially as set forth.

W. B. MOUNTENEY.

Witnesses:
JOHN S. ZIMMERMAN,
GEO. A. MILLIKEN.